United States Patent [19]
Gold

[11] Patent Number: 5,699,711
[45] Date of Patent: Dec. 23, 1997

[54] SAW GUIDE

[75] Inventor: Laurence H. Gold, Takoma Park, Md.

[73] Assignee: Kidshop, Inc., Takoma Park, Md.

[21] Appl. No.: 636,793

[22] Filed: Apr. 22, 1996

[51] Int. Cl.$^6$ .............................. B26D 7/04; B27B 11/00
[52] U.S. Cl. .............................. 83/743; 83/454; 83/764
[58] Field of Search .............................. 83/455, 468.3, 83/468.4, 574, 743, 454, 762, 764

[56] References Cited

U.S. PATENT DOCUMENTS

| | | | |
|---|---|---|---|
| 228,686 | 6/1880 | Smith | 83/455 |
| 789,005 | 5/1905 | Conkey et al. | |
| 1,109,952 | 9/1914 | Armstrog | |
| 1,187,335 | 6/1916 | Kinley | |
| 2,146,916 | 2/1939 | Richards | |
| 2,464,474 | 3/1949 | White | |
| 2,559,434 | 7/1951 | Hyland | 83/455 |
| 2,598,117 | 5/1952 | Ethridge | |
| 2,789,596 | 4/1957 | Barnes et al. | 83/468.3 |
| 3,354,769 | 11/1967 | Abramson et al. | 83/455 |
| 3,389,724 | 6/1968 | Paul | |
| 3,590,891 | 7/1971 | Guglielmo | |
| 4,054,077 | 10/1977 | Gram | 83/574 |
| 4,056,030 | 11/1977 | Hahn | |
| 4,096,777 | 6/1978 | Adams | 83/455 |
| 4,158,523 | 6/1979 | Schotzko | |
| 4,226,152 | 10/1980 | Bies | |
| 4,437,375 | 3/1984 | Elmore et al. | |
| 4,505,039 | 3/1985 | Donovan | |
| 4,570,350 | 2/1986 | Cullison | |
| 4,615,251 | 10/1986 | Volk | 83/574 |
| 4,685,369 | 8/1987 | Beamer | |
| 5,050,473 | 9/1991 | Ingram et al. | 83/468.3 |
| 5,148,730 | 9/1992 | McCaw | 83/574 |
| 5,182,975 | 2/1993 | Warner | 83/574 |
| 5,226,345 | 7/1993 | Gamble | 83/574 |
| 5,279,198 | 1/1994 | Cross | |

FOREIGN PATENT DOCUMENTS

| | | | |
|---|---|---|---|
| 954663 | 10/1947 | France | 83/455 |
| 166809 | 1/1906 | Germany | 83/455 |
| 1316107 | 5/1973 | United Kingdom | 83/455 |

OTHER PUBLICATIONS

The Village Blacksmith Country Furniture, by Aldren A. Watson, p. 112, 1974 (no month given).

*Primary Examiner*—Kenneth E. Peterson
*Assistant Examiner*—Sean A. Pryor
*Attorney, Agent, or Firm*—Dorsey & Whitney

[57] ABSTRACT

A saw guide to enable a user to cut a straight line using a hand saw consists of a base having a slot formed therein which divides the base into first and second side-by-side sections. A fixed guide is mounted above the first section, with the central portion thereof being spaced apart from the base to form a cavity into which the board or other work to be cut is inserted. An adjustable guide is mounted above the second section, with the central portion thereof forming an adjustable cavity through which the board cut project. The adjustable guide includes manually operable adjustment knobs at the upper end of threaded bolts which extend through the ends of the adjustable guide and, at their lower ends, screw into threaded collars in bores within the base. As the knobs are turned, the adjustable guide descends, thereby decreasing the height of the adjustable cavity until the adjustable guide clamps against the board and holds it tightly against the base. A narrow space is formed between the inner ends of the fixed and adjustable guides. This space is aligned above the slot. When a saw blade is introduced through the space and the slot, and is reciprocated therein, it creates a straight cut through the board which is clamped to the base.

14 Claims, 2 Drawing Sheets

SAW GUIDE

BACKGROUND OF THE INVENTION

This invention relates to a new and improved form of saw guide, a guide which can be used readily by small children, disabled persons, untrained workers and others who might have difficulties in severing a board or other object along a straight line.

One of the difficulties which small children and others unskilled in the use of hand tools encounter in attempting to use a hand saw is in making a straight cut in a piece of wood or other object. Such inability to cut along a straight line has been recognized in the prior art and has resulted in the development of a number of different types of jigs, guides, and other devices which assist a user of a saw or related hand tool in making a straight cut.

Of course, one of the best known forms of such prior art devices is the conventional miter box in which a pair of spaced upstanding walls have slots formed therein at prescribed angles, and wherein the work to be cut is inserted between these upstanding walls. The difficulty with conventional miter boxes is, first, that the work to be cut is not directly attached in any manner to the miter box itself, thereby requiring the user to either hold the work or clamp the work, as by inserting the same in a vise, and second, that the cut can only be made at the preformed angles set in the miter box. One of the attempts to overcome the shortcomings of the conventional miter box is shown in U.S. Pat. No. 4,685,369 issued to R. Beamer, which discloses the use of a portable miter device including means and adjustable arms. Another such prior art attempt in connection with miter boxes is shown in a 1974 publication entitled "Country Furniture," authored by A. Watson, and showing on page 112 thereof a miter box which is clamped to the work to be cut.

Other prior art forms of saw guides have been known and patented throughout the course of the Twentieth Century. One of the earliest is shown in U.S. Pat. No. 789,005, issued to A. I. Conkey et al, in which upstanding guide slots control the movement of an elongated blade on a two-person hand saw. Other such prior art devices include those shown in U.S. Pat. No. 1,109,952, issued to C. H. Armstrong, which provides a guide for cutting a circular gas pipe; U.S. Pat. No. 1,187,335, issued to F. A. Kinley, which provides an upstanding guide having a single slot therein for the blade of a hand saw; U.S. Pat. No. 2,598,117, issued to J. P. Ethridge, which provides a guide and gauge for a cuing tool which shapes the end portions of shafts; U.S. Pat. No. 3,389,724, issued to B. M. Paul, which provides a pair of spaced plates for securing a work to be cut and a movable carriage for guiding a power saw which will cut the work; and U.S. Pat. No. 4,096,777, issued to C. L. Adams, which provides a guide means for cutting work on a radial arm or table saw.

While all of these prior art forms of saw guides are intended to accomplish generally the same purposes as the present invention, they are, in comparison to the present invention, either more complicated and more expensive in design, or alternatively, more difficult to use or more limited in their capabilities.

OBJECTS AND SUMMARY OF THE INVENTION

It is, accordingly, an object of present invention to overcome the difficulties and deficiencies associated with known forms of saw guides and to provide a new and improved form of saw guide.

Another object of the present invention is to provide a saw guide which is relatively inexpensive and which can be easily manufactured by the use of woodworking tools.

Another object of the present invention is to provide a saw guide which is extremely simple to use and thereby enables an operator, such as a young child, to be able to use the device entirely on his or her own.

Another object of the present invention is to provide a saw guide which is lightweight and portable and which can be used in a variety of different environments.

Other objects, advantages and salient features of the present invention will become apparent from the following detailed description which, taken in conjunction with the annexed drawings, disclose a preferred embodiment thereof.

The foregoing objects are obtained by providing a saw guiding device which includes a base having a saw blade receiving slot extending longitudinally thereof and dividing the base into first and second sections on opposite sides of the slot. A fixed guide is attached at its opposite ends to the first section of the base and the center section or portion of this fixed guide is spaced away from the base and thus forms an object receiving cavity between the base and the center portion. The device also includes an adjustable guide having a central portion and having depending portions at opposite ends thereof. The adjustable guide is positioned above the second section of the base, and thus adjacent to the fixed guide. The space between the inner edges of the fixed guide and adjustable guide forms an opening or slot which is aligned directly above the slot in the base. Digitally operable adjusting means are mounted within the depending portions of the adjustable guide, and these adjusting means are engagable with the second section of the base. Advantageously, the adjusting means are in the form of knobs attached to bolts which thread into recesses within the base. An adjustable cavity is formed between the central portion of the adjustable guide and the base. As a result, when a board or other object to be cut is inserted through the object receiving cavity and the adjustable cavity, and the adjusting means are thereafter tightened, the adjustable guide will clamp the board or object against the second section of the base. The saw blade can then be inserted through the aligned slots and as the saw is reciprocated within the slots, the board or object will be severed along the straight line defined by the slots. Obviously, by turning the object at an angle with respect to the slots, the cut will be made along an angle.

BRIEF DESCRIPTION OF THE DRAWINGS

Referring now to the drawings in further detail.

DETAILED DESCRIPTION OF THE DRAWINGS

Figure 1:
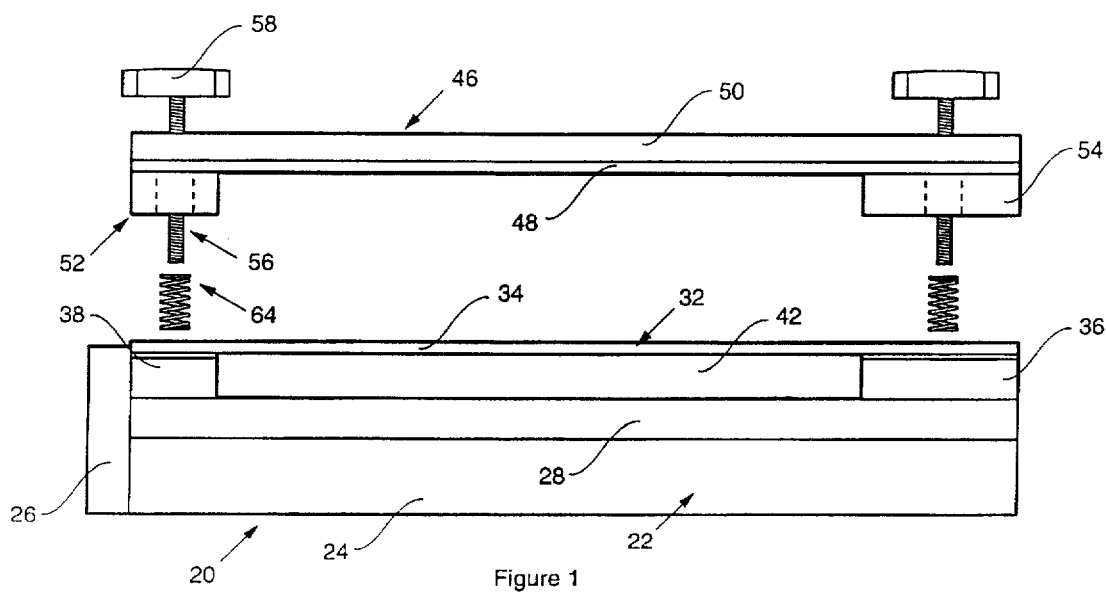
FIG. 1 is a side elevational view of a device in accordance with the present invention, with the adjustable guide and adjusting means being shown in partially exploded form for illustrative purposes.

Referring now to the drawings in further detail a saw guide in accordance with the present invention is generally designated 20. The guide includes a base generally designated 22 which consists of a longitudinal upright or stretcher 24 connected with a perpendicular end plate 26 and carrying thereon a horizontal top plate or base plate 28.

Figure 2:
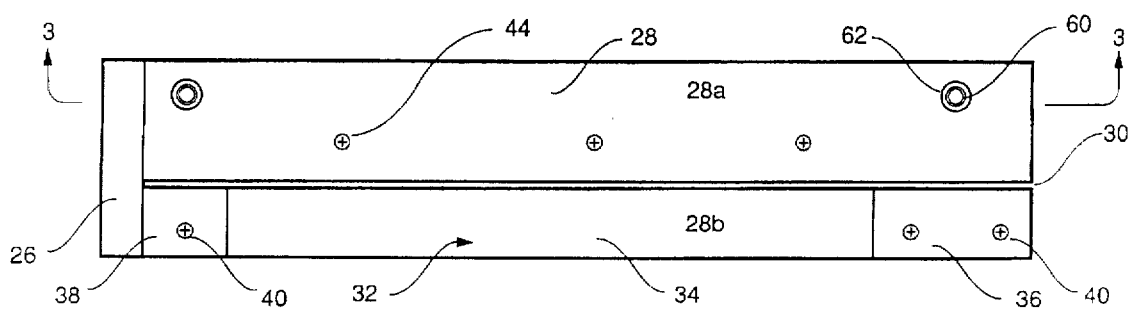
FIG. 2 is a top plan view of the device.
Figure 6:
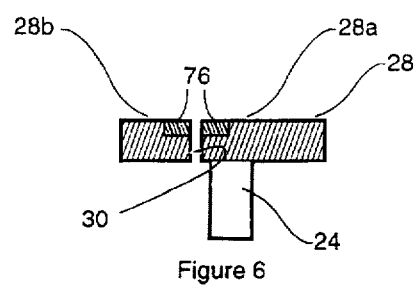
FIG. 6 is a fragmentary transverse sectional view taken along the line 6—6 of FIG. 5.

A slot 30 extends longitudinally through the base plate 28 from the end thereof opposed to the member 26 and extending completely to the end plate 26. As can best be seen from FIGS. 2 and 6, the slot 30 is offset from the center of the plate 28 and it serves to divide the base plate 28 into a larger first section 28a and a narrower second section 28b. The portion 28a is attached to the upright member 24 of the base by screws 44, as shown in FIG. 2, while the slot 30 is offset to one side thereof.

A fixed guide generally designated 32 is coupled to the second section 28b of the base. The fixed guide 32 includes an elongated plate or bar 34 having a pair of depending end blocks 36 and 38, at the opposite ends thereof. The smaller block 38 abuts against the end plate 26 of the base while the opposite end member 36 overlies the far end of the base plate 28. Conventional screws 40 are employed to attach the bar 34 to the end members 36 and 38. In turn, the end members are permanently affixed to the base plate portion second section 28b, as, for example, by screws or by an adhesive attachment.

An opening or cavity 42 is formed between the bar 34 and the base plate 28. This cavity 42 forms an object receiving cavity; that is, it defines the cavity into which a board or other object to be cut is introduced into the device 20. The bar 34 is advantageously formed of a transparent plastic material, such as Lexan, in order to permit the user to see the object which is inserted into the cavity 42.

The device also includes an adjustable guide generally designated 46. This guide includes a lower plate 48 advantageously formed of transparent material, such as Lexan, and an overlying upper bar 50 which is somewhat narrower in width. The adjustable guide 46 also includes a pair of opposed end members 52 and 54. The end member 52 has the same longitudinal width as the end block 38 on the fixed guide, while the end member 54 has the same longitudinal width as the end block 36 on the fixed guide.

The device also includes digitally operable adjusting means coacting between the adjustable guide 46 and the base 22. The adjusting means includes a pair of elongated bolts 56 extending through the ends of the adjustable guide 46. At the upper ends, the bolts carry manually operable adjustment knobs 58. The bolts themselves screw into threaded collars 60 which are mounted within bores 62 within the first section of the base plate. Finally, compression springs 64 are provided to surround the bolts 56 and to coact between the top of the threaded collars 60 and the undersides of the adjustable guide end members 52 and 54.

Figure 3:
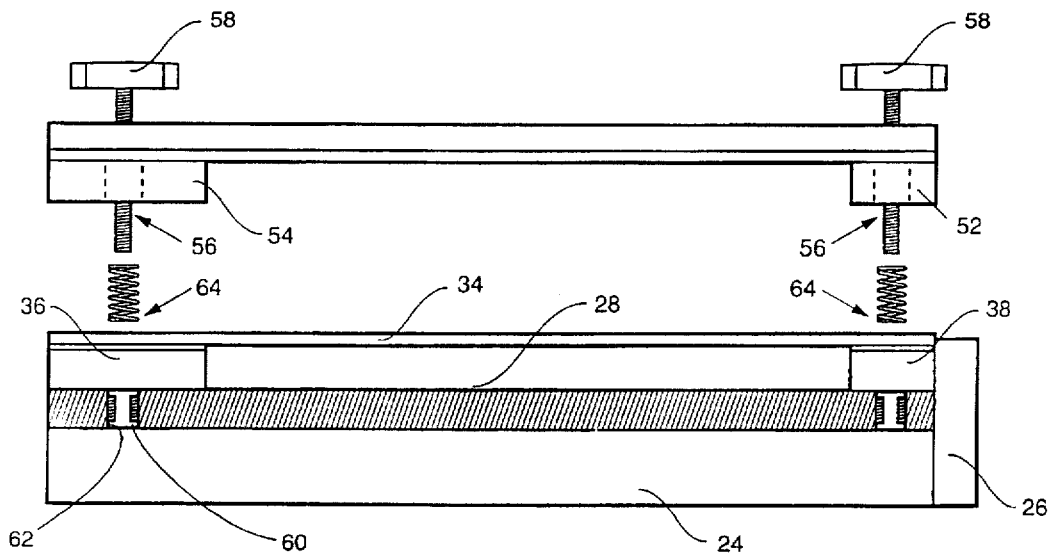
FIG. 3 is a longitudinal sectional view of the device taken along the line 3—3 of FIG. 2.

For illustrative purposes, the adjustable guide 46 is shown in FIGS. 1 and 3 separated from and spaced above the remainder of the guide. It will be understood, however, that when the device is in use, the adjustable guide is lowered until the bolts 56 are threaded into the collars 60. Once that occurs, as shown in FIG. 5, another cavity, which can be referred to as the adjustable cavity 66, is formed between the top of the base plate 28 and the bottom of the plate 48 on the adjustable guide.

Figure 4:
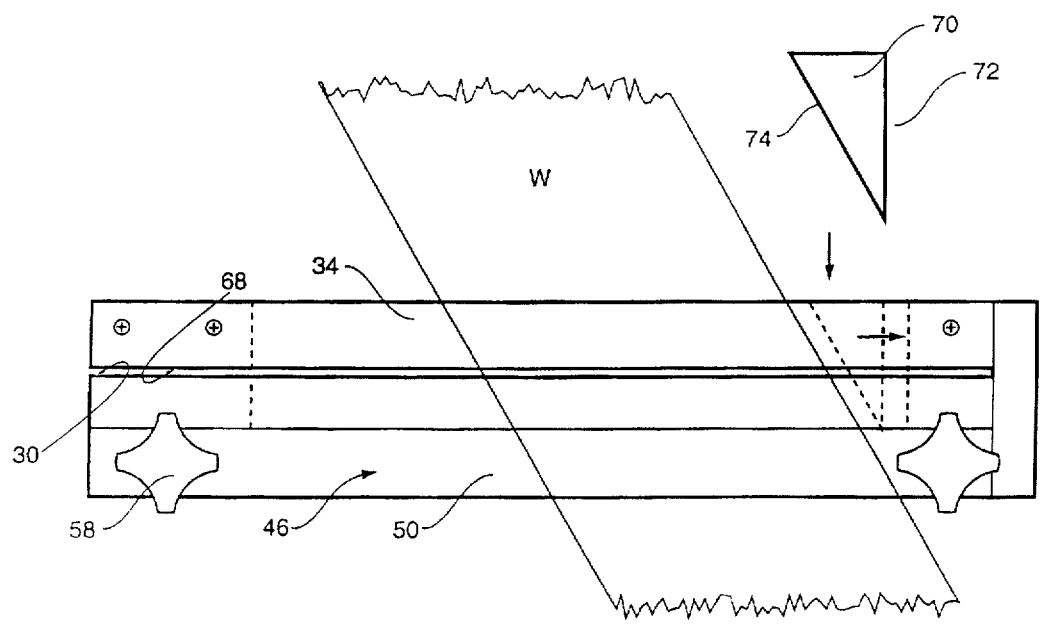
FIG. 4 is a plan elevational view of the device.

As can best be seen from FIG. 4, a second slot 68 is formed between the spaced but confronting inner edges of the bar 34 on the fixed guide and the plate 48 on the adjustable guide. The second slot 68 is aligned directly above the slot 30 in the base plate 28.

Figure 5:
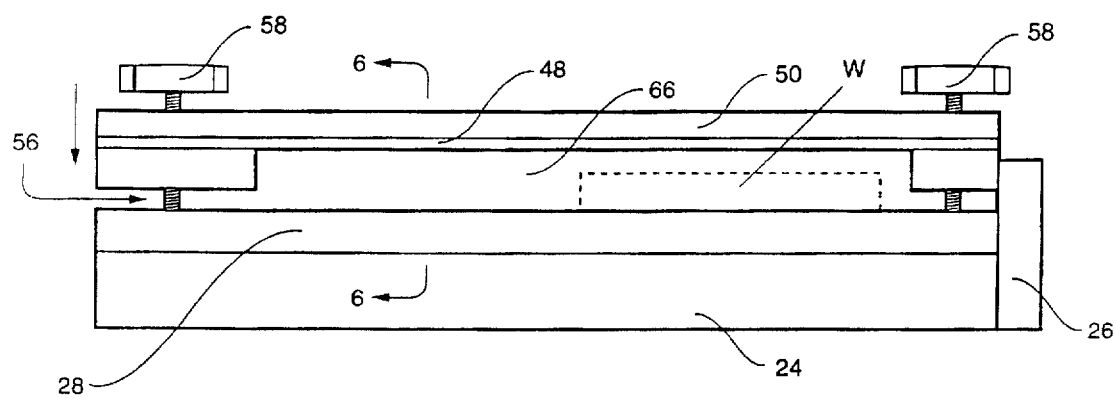
FIG. 5 is a side elevational view of the device with the adjustable guide being attached thereto.

As shown in FIG. 5, when a board or piece of work W is inserted in the saw guide, it passes through the fixed cavity 42 and the adjustable cavity 66. In FIG. 5, the height of the adjustable cavity 66 is somewhat greater than the thickness of the work W. Accordingly, the user would make the requisite adjustment, by rotation of the knobs 58, to lower the adjustable guide, as shown by the arrow at the left side of FIG. 5, until the plate 48 of the adjustable guide presses against, and thus clamps and confines, the work W. The user would then insert the saw blade through the open end of the aligned slots 30 and 68, and saw through the work W in a direction toward the end plate 26 of the base. As will be apparent, since the saw blade is being guided, it can only cut along the straight line defined by the guide slots and thus make a straight cut through the work W.

Although the device is perfectly capable of cutting a board or other work at any desired angle, simply by clamping the work against the base through the use of the adjustable guide, it may also prove useful in practice to provide supplemental guide blocks to assure that the cut will be formed at an exact prescribed angle, such as 30° or 45°. In this regard, a supplemental guide block 70 is shown in FIG. 4. Such a guide block has a straight edge 72 and a angled edge 74. In use, the block 70 is inserted into the object receiving cavity 42 and is moved to a position where the straight edge 72 abuts against the inner edge of the end members 38 and 52. The work W is then aligned with one side thereof abutting against the angled side 74 of the block 70. This places the work at a prescribed angle within the saw guide, in the manner illustrated in FIG. 4. Accordingly, when the guide is used to guide the blade of the saw, the cut through the work W will be at the correct angle.

In the event that repeated usage of the saw guide tends to enlarge the guide slot 30 and thus affect its accuracy, it is possible to compensate for this problem through the use of replaceable inserts 76 mounted within the base plate 28 on opposite sides of the slot 30. Once the inserts 76 become worn during use, they can readily be replaced.

It should be apparent that the entire saw guide of the present invention can be readily manufactured through the use of simple and commercially available materials, using standard woodworking tools. Thus, a hobbyist or teacher could readily manufacture such a guide in his or her own workshop. In use, the guide can be held in place by being clamped to the wood, which wood can then be placed in a vise, or alternatively, by using one or more C-clamps to attach the same to a work bench or table.

After reading the foregoing detailed description, it should be apparent that the objects set forth at the outset of the specification have been successfully achieved. Various changes apparent to those skilled in the art may be made without department from the spirit and scope of the invention as defined in the appended claims.

What is claimed is:

1. A saw guiding device which enables a user to hold and cut a flat object, such as a board, along a straight line, comprising:

a base having a saw blade receiving slot extending longitudinally through one end thereof, dividing said base into a first section and a second section on opposite sides of said slot;

a fixed guide attached at opposite ends to said first section of said base and having a central portion spaced above said base to form an object receiving cavity between said base and said fixed guide, said object receiving cavity of fixed size;

an adjustable guide having a central portion and depending portions at the ends thereof;

said adjustable guide being positioned above said second section of said base, with the space between said central portion and said second section of said base defining an adjustable cavity of adjustable size;

said fixed guide and said adjustable guide being positioned in spaced juxtaposition to each other on opposite sides of said slot, having a space between them which is aligned along and above said slot;

wherein said slot and said space between said fixed guide and said adjustable guide, extends completely through said one end of said base to a point on said opposite end of said base, providing an opening for a saw blade to pass longitudinally through said one end via said slot; and digitally operable adjusting means mounted within said depending portions of said adjustable guide and engageable with said second section of said base;

said device being operable by inserting an object to be cut through said object receiving cavity and said adjustable cavity, positioning the object with the area to be cut aligned along and above said slot, operating the adjusting means to lower the adjustable guide until the central portion thereof abuts against the object and holds it in place, and then inserting a saw blade through said space and said slot to enable the user to cut the object along a straight line.

2. A device as defined in claim 1 wherein said adjusting means includes:

a threaded member having an upper and lower end portion extending through each of said depending portions;

a knob attached to each of said threaded members at the upper end portion thereof; and a pair of threaded receiving apertures in said base;

said lower end portions of said threaded members being engaged within said receiving apertures, whereby when said knobs are rotated, said threaded members will screw into or out of said apertures, thereby adjusting the height of said adjustable guide above said base.

3. A device as defined in claim 2 wherein said adjusting means further includes compression springs surrounding said lower ends of said threaded members to normally bias said adjustable guide away from said base.

4. A device as defined in claim 2 wherein said central portion of said fixed guide is transparent to enable the user to view the object within the object receiving cavity and align the object along the slot.

5. A device as defined in claim 2 wherein said fixed guide includes an engagement portion at one end thereof and said depending portions of said adjustable guide having inner ends facing each other, said engagement portion being aligned with the inner end of one of said depending portions on said adjustable guide to jointly create an abutment against which an edge of the object can abut.

6. A device as defined in claim 5 further including a supplemental member insertable through said object receiving and adjustable cavities, said supplemental member having a side edge thereof engageable against said abutment and having a different side edge thereof extending across said slot at an angle with respect thereto, whereby the object to be sawed is engaged against said different side edge to assure that the cut through said object will be an angular cut.

7. A saw guiding device for cutting a work object along a straight line and clamping the work object, comprising:

a base having a first section opposite a second section, and a first end opposite a second end, the first and second sections located between the first and second ends;

a slot extending longitudinally through one end thereof, dividing said base into a first section and a second section on opposite sides of said slot, said slot ending at a closed first end of said base and open at a second end of said base;

a first fixed guide, attached to the first end and to the second end, extending parallel to the slot across and spaced apart from the first section;

a first fixed work object receiving cavity being of fixed size and being formed in the space between the first fixed guide and the first section;

a second adjustable guide, attached to the first end and the second end, extending parallel to the slot across and spaced apart from the second section, the second adjustable guide parallel to the first fixed guide and having an adjustment means disposed thereon;

a second adjustable work object receiving cavity being of adjustable size and being formed in the space between the second adjustable guide and the second section;

wherein the adjustment means moves the second adjustable guide in relation to the second section, causing the second adjustable work object receiving cavity to change in dimension, to clamp the work object, and wherein the adjustment means does not move the first fixed guide and does not change the dimension of the first fixed work object receiving cavity.

8. The device of claim 7, wherein the adjustment means comprises:

a first threaded member, extending through the second guide and into a threaded aperture in the first end;

a second threaded member, extending through the second guide and into a threaded aperture in the second end;

a first knob attached to the first threaded member, for spinning the first threaded member within the first end aperture;

a second knob attached to the second threaded member, for spinning the second threaded member within the second end aperture.

9. The device of claim 8, wherein the independent adjustment means further comprises:

a first spring, contacting the first end and the second guide, and enclosing a portion of the first threaded member, the first spring being normally biased against the second guide to move the second guide away from the first end;

a second spring, contacting the second end and the second guide, and enclosing a portion of the second threaded member, the second spring being normally biased against the second guide to move the second guide away from the second end.

10. The device of claim 7, wherein the first guide and second guide comprise transparent material.

11. The device of claim 7, wherein the first guide further comprises:

a first abutment block, located at the first end;

a second abutment block, located at the second end;

wherein the work object is abutted against the first or second abutment block;

and wherein the slot is centrally located between the first and second guides.

12. The device of claim 11, wherein the second guide further comprises:

a third abutment block, located at the first end and aligned with the first abutment block;

a fourth abutment block, located at the second end and aligned with the second abutment block;

wherein the work object is abutted against the first and third, or second and fourth, abutment blocks.

13. The device of claim 12, further comprising:

a supplemental block, comprising a first portion and a second portion, the second portion being adjacent and at an angle to the first portion;

wherein the first portion is abutted against the first and third, or second and fourth, abutment blocks, and wherein the work object is abutted against the second portion.

14. The device of claim 7, wherein the slot extends from the first end completely through the second end to allow a saw blade to enter through the second end.

* * * * *